Sept. 15, 1964      F. R. REID      3,148,635

METHOD AND APPARATUS FOR HANDLING DOUGH AND THE LIKE

Filed Oct. 9, 1961      2 Sheets-Sheet 1

INVENTOR
FRANCIS R. REID
BY Williamson & Palmatier
ATTORNEYS

Sept. 15, 1964   F. R. REID   3,148,635
METHOD AND APPARATUS FOR HANDLING DOUGH AND THE LIKE
Filed Oct. 9, 1961   2 Sheets-Sheet 2
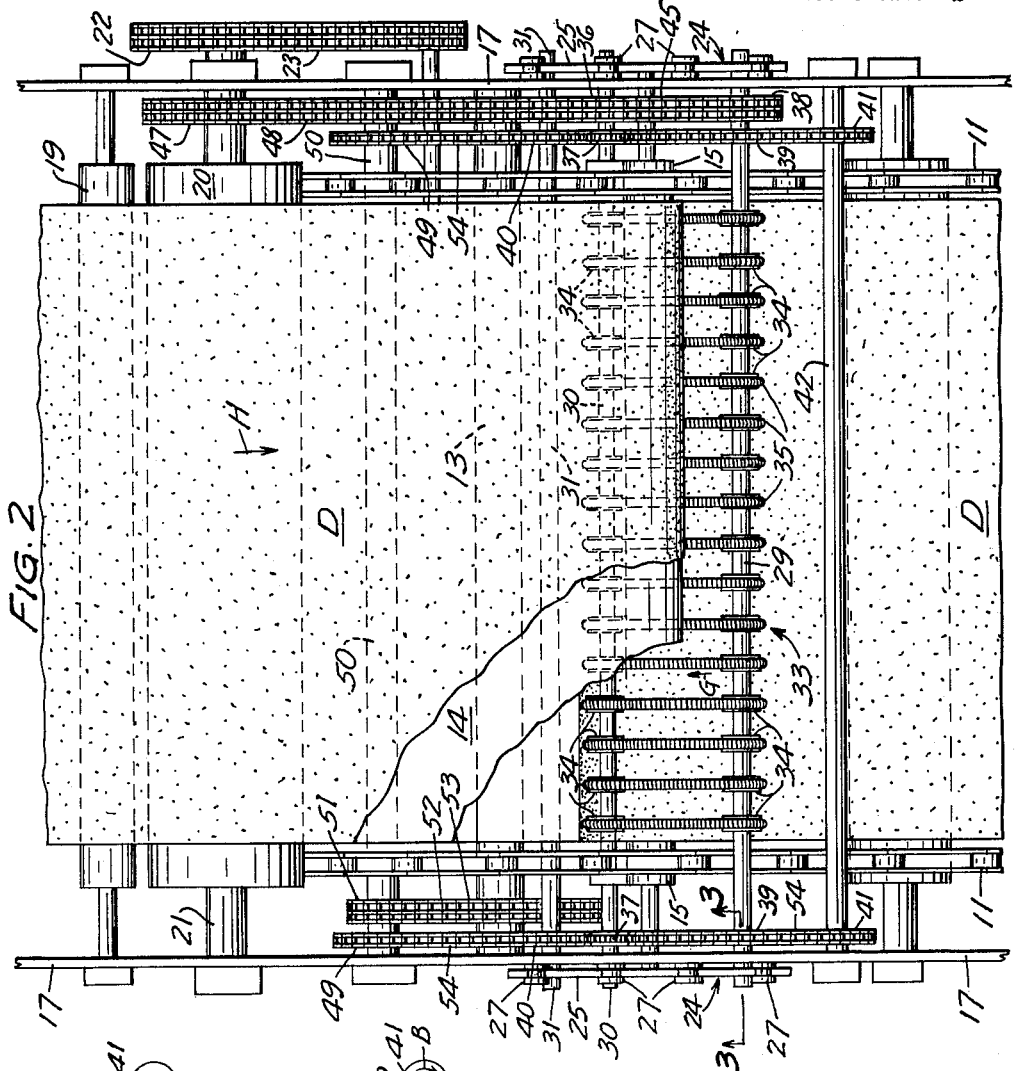
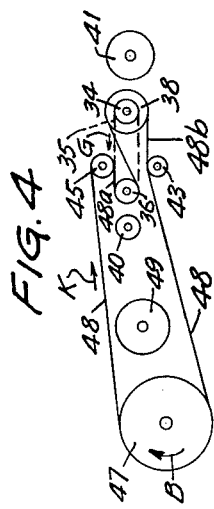
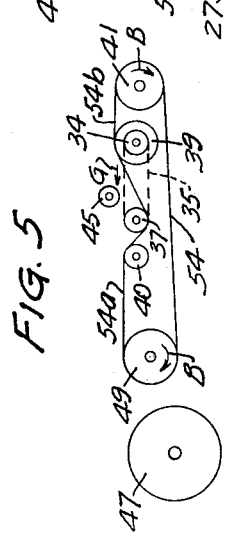
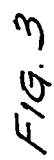
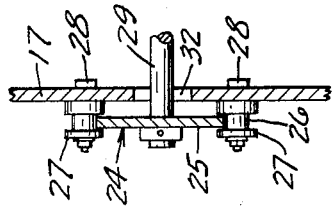
INVENTOR
FRANCIS R. REID
BY
Williamson, & Palmatier
ATTORNEYS

United States Patent Office 3,148,635
Patented Sept. 15, 1964

3,148,635
METHOD AND APPARATUS FOR HANDLING
DOUGH AND THE LIKE
Francis R. Reid, Pleasure Ridge Park, Ky., assignor to The
Pillsbury Company, Minneapolis, Minn., a corporation
of Delaware
Filed Oct. 9, 1961, Ser. No. 144,812
7 Claims. (Cl. 107—7)

This invention relates to the method of and apparatus for changing the pattern of movement of a sheet of material in a plastic stretchable state from one pattern of forward linear travel to another pattern of linear travel without stretching the dough.

The handling of dough by automatic machinery for cutting the dough and packing the cut wafers of dough into a can or other receptacle involves intermittently and cyclically moving dough along a conveyor so that the dough is supplied at the can-packing stations and then allowing the dough to remain stationary during the packing operation. It has been a problem to supply the dough to the intermittently and cyclically moving conveyor in a manner so that the slab or sheet of dough is essentially continuous and of constant thickness and of constant weight per unit of area of dough in the slab. Ordinarily as the dough is formed into a belt or slab, this operation is done progressively and continuously so that the slab of dough will be supplied from its point of formation at a continuous rate. During the transfer of the dough from the continuously operating supply conveyor to the intermittently and cyclically operated conveyor at the packaging machinery, there has been a tendency for some stretching of the dough. Of course the stretching of the dough decreases the thickness of the slab and therefore decreases the weight of dough per unit of area in the slab. Of course it is desirable to maintain as close manufacturing tolerances as possible while still maintaining accurate rates per unit of area of the slab of dough and above a prescribed minimum.

An object of my invention is to provide a new and improved apparatus of relatively simple construction, producing a first predetermined pattern of movement of a sheet of material in a plastic stretchable state and then producing a second pattern of movement of the sheet while maintaining the overall average velocity constant and without stretching the sheet of material.

Another object of my invention is to provide an improved and novel method of moving a sheet of material in a plastic stretchable state in a first pattern of movement and then in a second pattern of movement and transferring the sheet from said first to said second patterns of movement without stretching the sheet.

Still another object of my invention is to provide a novel apparatus conveying a continuous slab of biscuit dough at a constant rate and then conveying the slab of dough at an intermittent cyclical rate without changing the overall average velocity, and changing the pattern of movement of said slab from said constant rate to the intermittent cyclical rate without stretching the dough.

These and other objects and advantages of my invention will more fully appear from the following description made in connection with the accompanying drawings wherein like reference characters refer to the same or similar parts throughout the several views and in which:

FIG. 2 is a detail top plan view partly broken away for clarity of detail;

FIG. 3 is a detail section taken at 3—3 in FIG. 2; and

FIGS. 4 and 5 are diagrammatic views showing the individual directions of travel of the drive chains.

Figure 1:
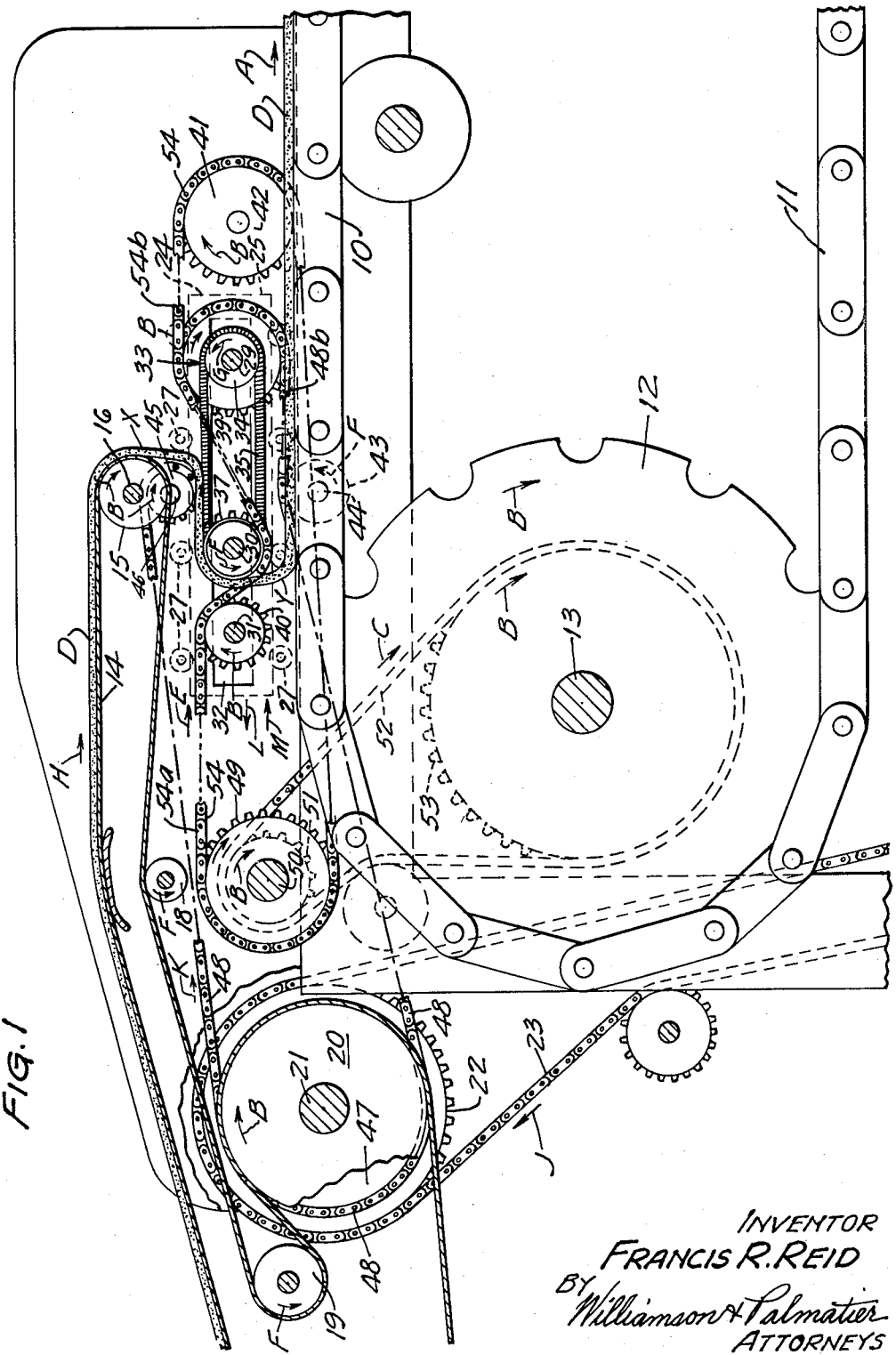
FIG. 1 is a longitudinal section view through the apparatus and being partly broken away for clarity of detail.

One form of the present invention is shown in the drawings and is described herein. The apparatus shown in the drawings includes a dough conveyor 10 which is intermittently and cyclically operated and moved at a predetermined overall rate of speed. The conveyor 10 may take the form of a plurality of cutter units pivotally connected to form a cutter belt, substantially as shown in my co-pending application Ser. No. 58,018 filed September 23, 1960 and entitled "Packer." The conveyor 10 has a "dwell" portion in its operating cycle and in the form of the invention shown, the conveyor 10 is stationary or stopped during said dwell portion which amounts to two-thirds, or 240° of each operational cycle; and the conveyor 10 moves a predetermined distance during the "index" portion of the cycle which amounts to the other one-third or 120° of each operational cycle. The conveyor 10 includes side chains 11 trained about sprockets 12 which are mounted on shaft 13. Power may be applied to the shaft 13 to produce the intermittent cyclical movement of the conveyor 10.

Another conveyor 14 is shown which is also a generally belt-type conveyor for supplying a substantially continuous sheet of material which in the present disclosure constitutes biscuit dough which is plastic and stretchable. The conveyor 14 is trained around an idler roller 15, the shaft 16 of which is journalled in a suitable bearing on the stationary frame 17. The conveyor is also trained over other idler rollers 18 and 19 which are suitably mounted on frame 17 and over a drive roller 20, the shaft 21 of which has a sprocket 22 affixed thereto and driven by a chain 23 at a constant rate of speed synchronized with the drive for conveyor 10 such that the conveyor 14 travels at a rate equal to the overall average velocity of the conveyor 10. It will therefore be seen that the sheet or blanket of dough D is supplied by the conveyor 14 at the same rate that the dough blanket is carried away by the conveyor 10, it being understood, of course, that the dough blanket on the conveyor 10 has instantaneous speeds varying between zero and a relatively high rate, as hereinafter more fully pointed out.

The stationary main frame 17 also supports a longitudinally reciprocable shuttle frame 24 which has a pair of end plates 25 slidably mounted and supported by the stationary frame 17. In the form shown, the shuttle frame end plates 25 are retained and guided in annular grooves 26 of rollers 27 which are secured to and journalled on studs 28 which are affixed to the stationary frame 17. The shuttle frame 24 also includes shafts 29 and 30 and 31 which extend across and above conveyor 10 and through suitably provided openings 32 in the stationary frame 17. It will therefore be seen that the shafts 29–31 are free to move in a fore-and-aft direction, transversely of their rotation axes.

A third conveyor indicated in general by numeral 33 is carried by the shuttle frame 24. More specifically, shafts 29 and 30 each carry a plurality of pulleys 34 spaced from each other along the lengths of the shafts. The pulleys 34 on shafts 29 and 30 are disposed opposite each other so as to be arranged in pairs and each pair of pulleys 34 carries a belt-type conveyor element 35 which in the form shown comprises an endless coil spring. It will be noted that the coil spring conveyor elements 35 are disposed in juxtaposed and spaced relation with each other and are disposed close enough together so as to adequately support the sheet of dough D which descends onto the conveyor 33 from the forward end of conveyor 14. As particularly seen in FIG. 1, the blanket of dough D travels in a rearward direction along the conveyor 33 and then descends onto the conveyor 10 for forward movement again.

The shaft 30 of the shuttle has a pair of side by side sprockets 36 affixed thereto. Shaft 30 also has a pair of sprockets 37 affixed thereto adjacent opposite ends thereof. The sprockets 36 and 37 are identical in size and diameter and are substantially identical in diameter to the pulleys 34.

The shaft 29 carries idler sprockets 38 and 39 in freely rotatable condition so that the sprockets may revolve at one speed while the shaft 29 is revolving at another speed. The sprockets 38 are both disposed at one end of shaft 29 and the sprockets 39 are disposed at opposite ends of the shaft and it will be noted that the sprockets 38 are aligned with the sprockets 36; and the sprockets 39 are aligned with the sprockets 37.

The shaft 31 is freely rotatable in its bearings on the end plates 25 and carries a pair of sprockets 40 on opposite ends thereof and in alignment with the sprockets 37 and 39.

Additional idler sprockets 41 are carried on a shaft 42 which is journalled in suitably provided bearings on the frame 17. The sprockets 41 are aligned with the sprockets 37, 39 and 40. Additional idler sprockets 43 are carried on shaft 44 below the shuttle frame 24 and in alignment with the sprockets 36 and 38 at one side of the frame structure.

Additional idler sprockets 45 are disposed above the shuttle frame 24 and mounted on a shaft 46 which is journalled in the stationary frame 17. The idler sprockets 45 are disposed in alignment with the sprockets 36, 38 and 43.

Power sprockets 47 are secured in driven relation on the shaft 21 to be driven at a constant rate of speed in a manner similar to conveyor 14. A pair of side-by-side drive chains 48 are trained around the sprockets 47, idler sprockets 45, driven sprockets 36, idler sprockets 38 and idler sprockets 43. It will be noted that the chains 48 have horizontal runs 48a extending in a fore-and-aft direction between the sprockets 45 and sprockets 36; and it will be further noted that the chains 48 have second horizontally extending fore-and-aft runs 48b between the sprockets 38 and the sprockets 43. It will further be noted that the horizontal runs 48b and 48a extend in opposite directions from the shuttle frame-mounted sprockets 38 and 36 to the idler stationary sprockets 43 and 45 respectively. The horizontal fore-and-aft runs 48a and 48b will be lengthened and shortened as the shuttle frame reciprocates in a fore-and-aft direction.

Additional power sprockets 49 are secured on opposite ends of shaft 50 to which is also affixed a sprocket 51 driven by chain 52 which is meshed with a sprocket 53 affixed on the shaft 13 of conveyor 10 so as to produce rotation of the power sprockets 49. Drive chains 54 are trained around power sprockets 49, over the idler sprockets 40, around drive sprockets 37, around the idler sprockets 39 and around the idler sprockets 41. The chain 54 has horizontal runs 54a and 54b extending in opposite fore-and-aft directions from the shuttle-mounted sprockets 40 and 39 respectively to the stationary frame-mounted sprockets 49 and 41 respectively so as to accommodate reciprocation of the shuttle frame 24 while maintaining the chains in tight condition.

During each cycle of operation of the conveyor 10, the conveyor 10 is stationary during two-thirds of the operating cycle, and during the remaining one-third of the operating cycle the conveyor 10 moves in the direction of arrow A three units of distance (actually in the construction involved the conveyor 10 moves 4 5/16 inches per cycle). As seen in FIG. 1, the sprocket 12 moves in the direction of arrow B (clockwise), shaft 13 revolves in the same direction and sprocket 53 also revolves in the direction of arrow B. Chain 52 is moved in the direction of arrow C, and sprocket 51 and shaft 50 are also revolved in the direction of arrow B. Likewise sprocket 49 is revolved in the direction of arrow B. Chain 54 is moved in the direction of arrow E which passes over the top of sprocket 40, and causes rotation of sprockets 40 in the direction of arrow B. Chain 54 passes under sprockets 37 and causes rotation of sprockets 37 and shaft 30 in the direction of arrow (counter-clockwise). Chains 54 which pass over sprockets 39 cause rotation of sprockets 39 in the direction of arrow B. Likewise chain 54 will produce rotation of idler sprockets 41 and shaft 42 in the direction of arrow B.

Rotation of sprockets 37 in the direction of arrow F causes travel of the conveyor elements 35 of conveyor 33 in the direction of arrow G, which is opposite or rearward with respect to the forward travel A of conveyor 10. It will be remembered that the pulleys 34 and shaft 29 rotate counter to sprockets 39.

In the apparatus shown in FIGS. 1 and 2, the conveyor 14 moves in a forward direction indicated by the arrow H, and the pulleys 15 and 20 revolve in the direction of arrows B, while pulleys 18 and 19 for the conveyor 14 revolve in the direction of arrows F. The chain 23 supplying power to the conveyor 14 moves in the direction of arrow J, and the sprockets 22 and 47 on shaft 21 revolve in the direction of arrow B. Chains 48 travel continuously in the direction of arrow K and cause rotation of sprockets 45 in the direction of arrow B, and cause rotation of sprockets 36 in the direction of arrow F and also cause rotation of sprockets 38 in the direction of arrow B. The idler sprockets 43 revolve in the direction of arrow F.

It will be understood that during each operating cycle of conveyor 10 wherein the total travel is three units of distance, the conveyor 14 will also travel three units of distance in this same period of time but in the disclosed embodiment the conveyor 14 travels continuously at a uniform speed at every instant. In contrast, however, the instantaneous velocities of conveyor 10 are not uniform because in two-thirds of the operating cycle, the speed of conveyor 10 is zero and during the remaining one-third of the cycle, the instantaneous speed of conveyor 10 is three times that of conveyor 14. However, the overall average velocities of conveyors 10 and 14 over the period of an operating cycle are identical.

It is pointed out that while conveyor 10 is stopped the shuttle 24 moves rearwardly in the direction of arrow L, and while conveyor 10 is moving (during the indexing portion of the cycle) the shuttle 24 is moving forwardly in the direction of arrow M.

While conveyor 10 remains stopped during the dwell portion of the cycle, the chains 54 are also stopped and the chains 54 tend to hold the sprockets 37, shaft 30 and sprockets 39 against rotation, wherefore the sprockets 36 are also held against rotation. However, conveyor 14 continues to move and the chains 48 also continue to move in the direction of arrow K; as a result of the continuing travel of chains 48, sprockets 36 will be revolved and cause sprockets 37 and shaft 30 to revolve. Whereas chains 54 remain stationary, the rotation of sprockets 37 results in linear travel of the shuttle frame 24 and conveyor 33 in the direction of arrow L. The sprockets 37 actually crawl or creep along chains 54. During this travel of the shuttle 24, the runs 54a and 54b of chains 54 are respectively shortened and lengthened.

During the dwell of conveyor 10 and travel of the shuttle in the direction of arrow L, the upper run of conveyor 33 continues to travel in the direction of arrow G, both with respect to the shuttle frame 25 and with respect to the stationary frame 17. During the dwell portion of the cycle, the conveyor 33 moves one unit of distance (1 7/16") with respect to the shuttle frame 25, and during this same dwell period, the shuttle frame also moves one unit of distance (1 7/16") in the direction of arrow L; and as a result the actual total travel along the upper run of conveyor 33 during the dwell portion of the cycle is two units of distance 2 7/8"). This is precisely equal to the movement of conveyor 14 and dough blanket D during this same period. It will therefore be seen that as the dough blanket travels over the rear end of conveyor 14 and descends to conveyor 33 during the dwell portion of the cycle, the dough blanket D is carried rearwardly at the same rate of speed as the dough blanket is supplied. In this manner, the dough blanket is looped downwardly and back upon itself at X as the dough leaves the constant speed conveyor 14. Because the dough is carried away by the conveyor 33 as fast as it is supplied by conveyor 14, no stretching of the dough blanket D will occur during this transfer from conveyor 14 to conveyor 33.

During the dwell portion of the cycle the dough blanket also descends from the conveyor 33 to the conveyor 10 and is thereby looped downwardly and back upon itself at Y. As the shuttle moves rearwardly one unit of distance, a similar length of dough blanket D is laid on the conveyor 10, thereby increasing the length of the loop Y in a rearward direction.

It will be understood that during the rearward travel in direction L of the shuttle, the conveyor 33 travels one unit of distance with respect to the shuttle to supply the proper length of dough to be laid down on the conveyor 10 to permit the rearward travel of the shuttle without stretching the dough blanket.

During the index portion of the operating cycle of conveyor 10, conveyor 10 travels three units of distance while conveyor 14 travels one unit of distance. Likewise chains 54 travel in the direction of arrow E three units of distance while chains 48 travel one unit of distance. Chains 48 continue to turn sprockets 36 at a fast speed in the direction of arrow F and tend to turn sprockets 37 and shaft 30 in a similar manner. However, because chains 54 are traveling three units of distance during the index portion of the cycle, and are thereby traveling thrice the speed of chains 48, the sprockets 37 are caused to revolve at a proportionate speed, causing shaft 30 and sprockets 36 to revolve at a similar speed. The result of the speed differentials between chains 48 and 54 is rolling of the sprockets 36 in the direction of arrow M along the run 48a of chains 48 and a corresponding lineal movement of the shuttle frame 25 in the direction of arrow M. During the index portion of the cycle the conveyor 33 moves rearwardly in the direction of arrow G with respect to the shuttle frame two units of distance; and because the shuttle frame moves one unit of distance in the direction of arrow M, the actual movement of conveyor 33 with respect to the stationary frame 17 is one unit of distance so as to receive and carry away the dough blanket D at the identical rate at which the dough blanket is being supplied by the conveyor 14.

Because the conveyor 33 is moving in the direction of arrow G with respect to the shuttle frame 24, two units of distance during the index portion of the cycle, the conveyor 33 supplies a corresponding length of dough blanket downwardly onto the conveyor 10, and because the shuttle frame 24 moves one unit of distance in the direction of arrow M during the indexing of conveyor 10, sufficient dough is supplied to the conveyor 10 so as to prevent any stretching of the dough as it is applied to the conveyor 10. It will be understood that during the index portion of the cycle, the loop Y of the dough blanket is shortened by one unit of distance.

It will be understood that as runs 48a of chains 48 are shortened during the movement of the shuttle frame in the direction of arrow M, the runs 48b are accordingly lengthened. Similarly, during the movement of shuttle frame 24 in the direction of arrow M, the runs 54a and 54b of chains 54 are respectively lengthened and shortened.

It will be understood that the diameters of sprockets 53, 51 and 49 are so related as to produce motion in chains 54 identical to that of conveyor 10. Likewise, the rate of motion of chain 23 is adjusted so that the conveyor 14 has an overall average velocity identical to that of conveyor 10. Likewise sprockets 47 are of such a size as to give chains 48 a velocity identical to that of conveyor 14. The diameters of sprockets 36 and 37 are identical and are identical with the diameters of the pulleys 34 so as to produce the desired motion of conveyor 33.

It will be understood that a portion of the present invention is an improved method in the art of translating the linear motion of a sheet of stretchable plastic material such as biscuit dough from a continuous motion to an intermittent motion without stretching the sheet, and said method consisting in continuously moving the sheet of dough D along an upper run in a forward direction at a constant rate and to a predetermined position, then looping the dough sheet downwardly at said position and back upon itself along an intermediate run and moving the sheet of dough along said intermediate run in a rearward direction, opposite to said previously mentioned forward direction at the same constant rate that the dough is moved forwardly along the upper run; from the intermediate run, the sheet of dough D is looped downwardly and back upon itself along a lower run in the previously mentioned forward direction; the sheet of dough is alternately and cyclically moved forwardly and retained against movement at the lower run during separate first and second portions of each operating cycle, and the sheet will be moved forwardly along the lower run during the first portion of each cycle a distance equalling the total travel along the upper run during a complete cycle so that the actual overall average velocity of the dough sheet D in the lower run equals the constant rate of travel of the sheet in the upper run; the length of dough sheet in the lower and intermediate runs is alternately cyclically increased and decreased as the sheet is respectively retained against movement and moved during each cycle of operation in the lower run, and the lengths of said intermediate and lower runs will be increased and decreased by an increment equalling one-third the total distance of travel of the dough sheet along the upper and lower runs to complete operating cycle in the instance wherein the dough sheet is stationary in the lower run for two-thirds of the operating cycle and is moving during one-third of the operating cycle. On the other hand, it will be noted that the incremental increase and decrease in the lengths of the intermediate and lower runs equal one-half the total travel of the dough sheet along the upper run while the dough at the lower run remains stationary.

It will be noted that the apparatus shown in the drawings is also adapted to accommodate transfer of a sheet of plastic material in a stretchable state without stretching the dough if the conveyor 14 has a cyclical pattern of movement other than a constant rate and if the conveyor 14 has the same or other cyclical pattern of movement. In substantially the same manner the dough will be applied to the conveyor 33 without being stretched and then applied to the conveyor 10 without being stretched. In the event that conveyor 14 or conveyor 10 has a slightly different pattern of cyclical movement than that herein described, the actual speed of conveyor 33 may vary slightly, and the speed and stroke of the shuttle slightly from that described, but the transfer of the sheet of dough from one conveyor to another will be accomplished without stretching or causing a pile-up of dough, it being assumed of course, that the overall average velocity of the conveyor 14 and conveyor 10 are identical.

For instance, if the operational cycle of conveyor 10 remains the same as that hereinbefore described wherein the conveyor 10 is stationary for two-thirds of the cycle and is moving during the remaining one-third, the conveyor 14 might be stopped during the first one-third of the cycle, might be moved during the second one-third of the cycle two units of distance, and might be moved during the third one-third of the cycle one unit of distance.

Under these assumed conditions the dough, conveyor 33, and shuttle frame 24 are stationary during the first third of the cycle, the conveyor 33 and shuttle frame 24 quickly move in the direction or arrows G and L respectively during the second third of the cycle to receive all of the dough supplied by conveyor 14 and causing a length of dough to be laid on conveyor 10; and during the third one-third of the cycle, the operation of the entire apparatus is identical to that hereinbefore described in connection with the index portion of the cycle.

It will be seen that I have provided a new and improved method of and apparatus for changing the pattern of movement of a sheet of material in a plastic stretchable state from one pattern of movement to another pattern of movement without stretching the sheet. In the disclosed embodiment the sheet is of biscuit dough and is changed from a constant rate of travel to an intermediate and cyclical rate of travel.

It will, of course, be understood that various changes may be made in the form, detail, arrangement and proportion of the parts without departing from the scope of my invention which consists of the matter described herein and set forth in the appended claims.

What I claim is:

1. Conveyor apparatus for receiving a sheet of material in a stretchable plastic state at a constant speed and delivering the sheet with an intermittent movement without stretching the sheet, said conveyor apparatus comprising first, second and third generally belt-type conveyors, the first and second conveyors moving forwardly in the same direction and at the same overall average speed, the discharge end of the first conveyor being spaced above and lapped with the second conveyor, the first conveyor moving continuously at a constant rate, the second conveyor moving intermittently in regular operating cycles, said third conveyor being disposed below and in closely spaced relation with the discharge end of said first conveyor and having a rear discharge end disposed above and in closely spaced relation with said second conveyor, a shuttle mounting said third conveyor, means mounting said shuttle for forward and rearward reciprocation, driving means connected in driving relation with said third conveyor and with said shuttle and connected in driven relation with said first and second conveyors and producing coordinated movement of the third conveyor and shuttle, the third conveyor and shuttle continuously receiving the sheet at a predetermined and constant position relative to the discharge end of said first conveyor, and said driving means moving the shuttle and third conveyor to move the sheet rearwardly from said position at said constant rate to deliver the sheet over said discharge end onto the second conveyor, said second and third conveyors cooperatively supporting the sheet in a loop extending rearwardly from the discharge end of said first conveyor, said driving means moving both the third conveyor and shuttle rearwardly as the second conveyor is stopped to increase by an increment the length of the dough in the loop and to apply a length equalling said increment of the sheet to the second conveyor, said driving means continuing to move the third conveyor rearwardly and moving the shuttle as the second conveyor moves forwardly to decrease the length of the loop in the sheet by a length equalling said increment and to quickly apply a length equalling twice said increment of the sheet to the second conveyor, the second conveyor continuously receiving the sheet at a predetermined location relative to the rear discharge end of the third conveyor, whereby to prevent the sheet from stretching.

2. A conveyor apparatus for receiving a sheet of material in a stretchable plastic state at a constant speed and delivering the sheet with an intermittent movement without stretching the sheet, said conveyor apparatus comprising a stationary frame, first, second and third generally belt-type conveyors, the first and second conveyors moving forwardly in the same direction at the same overall average speed, the discharge end of the first conveyor being spaced above and lapped with the second conveyor, the first conveyor moving continuously at a constant rate, the second conveyor moving intermittently in regular operating cycles, said third conveyor being disposed below and in closely spaced relation with the discharge end of said first conveyor and having a rear discharge end disposed above and in closely spaced relation with said second conveyor, a shuttle frame mounting said third conveyor, a drive shaft journalled on the shuttle frame for driving said third conveyor in a rearward direction, means mounting said shuttle frame for forward and rearward reciprocation, a plurality of shuttle-mounted rotary sprockets including a pair of driven sprockets having equal diameters affixed to the shaft and also including a plurality of idler sprockets, first and second drive chains respectively trained over said pair of driven sprockets, a pair of power sprockets journalled on the stationary frame and respectively meshed with said first and second chains, a plurality of guide sprockets journalled on the stationary frame and meshing with and guiding said chains, said shuttle-mounted and guide sprockets defining in each of said chains a pair of fore-and-aft runs extending in opposite directions from one of said shuttle-mounted sprockets to a guide sprocket to permit reciprocation of the shuttle frame and rolling of the shuttle-mounted sprockets along the chains, a pair of drive means connected with said power sprockets and respectively connected with said first and second conveyors and revolving said power sprockets to move said first and second chains with a motion identical to that of the first and second conveyors and with a direction and speed to constantly move said third conveyor rearwardly at said constant rate, whereby the sheet of material is transferred by said third conveyor from the first conveyor to the second conveyor without stretching the sheet.

3. Conveyor apparatus for preventing stretching of a sheet of plastic material, said conveyor apparatus comprising a stationary frame, first, second and third generally belt-type conveyors, the first and second conveyors being mounted on said stationary frame and moving forwardly in the same direction and at the same overall average speed, the discharge end of the first conveyor being spaced above and lapped with the second conveyor, the second conveyor having motion characteristics and instantaneous speeds different than that of the first conveyor, said third conveyor being disposed below and in closely spaced relation with the discharge end of said first conveyor and having a rear discharge end disposed above and in closely spaced relation with said second conveyor, a shuttle frame mounting said third conveyor, a drive shaft journalled on the shuttle frame for driving said third conveyor in a rearward direction, means mounting said shuttle frame for fore-and-aft reciprocation, a plurality of shuttle-mounted rotary sprockets including a pair of driven sprockets, said drive sprockets having equal diameters and being affixed to the shaft, and also including a plurality of idler sprockets, first and second drive chains respectively trained over said driven sprockets, a plurality of stationary sprockets journalled on the stationary frame and respectively meshed with said first and second chains, said stationary sprockets including a pair of power sprockets for driving said chains, said shuttle-mounted and stationary sprockets defining in each of said chains a pair of fore-and-aft runs extending in opposite directions from one of said shuttle mounted sprockets to a stationary sprocket to permit reciprocation of the shuttle frame and rolling of the shuttle-mounted sprockets along the chain, a pair of drive means connected with said power sprockets and respectively connected with said first and second conveyors and revolving said power sprockets to move said first and second chains with motions identical to that of said first and second conveyors respectively and with a motion and speed to move said third conveyor rearwardly with an instantaneous speed identical to that of said first conveyor, whereby to prevent stretching of the sheet being transferred from said first conveyor to said second conveyor.

4. The invention set forth in claim 3 wherein said drive means moves said first and second chains with a rate, direction and motion identical to that of the first and second conveyors respectively, the third conveyor including belt mounting pulley means affixed on said shaft and having a diameter equal to the diameter of said driven sprockets.

5. Apparatus for receiving a sheet of material in a stretchable plastic state from a first conveyor moving continuously in a forward direction and at a predetermined rate and applying the sheet on a second conveyor disposed below and in lapped relation with the discharge end of the first conveyor and moving intermittently in said forward direction and at an average overall velocity equalling said predetermined rate, said apparatus comprising a frame, a shuttle movably mounted on said frame for reciprocating forwardly and rearwardly, an endless conveyor on the shuttle and having a rearwardly moving dough-receiving and carrying upper run below the end of said first conveyor to receive the sheet from the first conveyor, said upper run having a rear end above the second conveyor to discharge the sheet onto the second conveyor, said endless conveyor forming a loop in the dough between the first and second conveyors, and drive means connected with said endless conveyor and with the shuttle and adapted for connection with said first and second conveyors and producing coordinated reciprocation of the shuttle and rearward movement of the upper run of the endless conveyor on the shuttle to continuously receive and support the sheet on the endless conveyor at a predetermined position relative to the frame and relative to the discharge end of the first conveyor and to continuously carry the sheet rearwardly from said position at said predetermined rate relative to the frame, and to successively move the shuttle rearwardly for increasing the size of the loop in the sheet and applying a length of the sheet to the second conveyor while the second conveyor is stopped, and then move the shuttle forwardly during the travel of the second intermittently movable conveyor for decreasing the size of the loop in the sheet and for applying the sheet to the second conveyor at a rate equalling the rate of relative linear travel between the shuttle and the second conveyor, whereby to continuously apply the sheet to the second conveyor at a constant position relative to the rear discharge end of the endless conveyor.

6. In the art of translating the linear motion of a sheet of stretchable material from a continuous motion to an intermittent movement without stretching the sheet, the method consisting in continuously moving the sheet along an upper run in a forward direction at a constant rate and to a predetermined position, looping the sheet downwardly at said position and back upon itself along an intermediate run and moving the sheet along said intermediate run in a rearward direction at a constant rate, looping the sheet downwardly and back upon itself along a lower run in a forward direction, moving the sheet forwardly and cyclically a distance during one-third of each cycle to produce an overall average velocity at said lower run equalling said constant rate, retaining the sheet against movement at said lower run during two-thirds of each cycle, and cyclically increasing and decreasing the lengths of each of said intermediate and lower runs by an increment equalling one-third of said distance when the sheet is respectively stopped and moved in said lower run.

7. In the art of translating the linear motion of a sheet of stretchable plastic material from a continuous motion to an intermittent movement without stretching the sheet, the method consisting in continuously moving the sheet along an upper run in a forward direction at a constant rate and to a predetermined position, looping the sheet downwardly at said position and back upon itself along an intermediate run and moving the sheet along said intermediate run in a rearward direction at said constant rate, looping the sheet downwardly and back upon itself along a lower run in a forward direction, alternately and cyclically moving the sheet forwardly and retaining the sheet against movement at said lower run during first and second portions, respectively, of each cycle, the sheet being moved forwardly along the lower run during said first portion of each cycle a distance equalling the total travel along said upper run during a complete cycle to produce an overall average velocity of the sheet at said lower run equalling said constant rate of the sheet in said upper run, and cyclically increasing and decreasing the length of each of said intermediate and lower runs as the sheet is respectively retained and moved during each cycle in said lower run, the lengths of said intermediate and said lower runs being increased and decreased by an increment equalling one-half of the incremental travel of the sheet along the upper run during said second portion of the cycle during which the sheet is retained against movement at said lower run.

References Cited in the file of this patent
UNITED STATES PATENTS
2,478,075    Baker _____ Aug. 2, 1949